(12) United States Patent
Luharuka et al.

(10) Patent No.: US 10,970,590 B2
(45) Date of Patent: Apr. 6, 2021

(54) IMAGE-BASED WELLSITE EQUIPMENT HEALTH MONITORING

(71) Applicant: SCHLUMBERGER TECHNOLOGY CORPORATION, Sugar Land, TX (US)

(72) Inventors: Rajesh Luharuka, Katy, TX (US); Ashok Veeraraghavan, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 15/579,355

(22) PCT Filed: Jun. 6, 2016

(86) PCT No.: PCT/US2016/035947
§ 371 (c)(1),
(2) Date: Dec. 4, 2017

(87) PCT Pub. No.: WO2016/197079
PCT Pub. Date: Dec. 8, 2016

(65) Prior Publication Data
US 2018/0181830 A1   Jun. 28, 2018

Related U.S. Application Data

(60) Provisional application No. 62/171,993, filed on Jun. 5, 2015.

(51) Int. Cl.
*G06K 9/46* (2006.01)
*E21B 41/00* (2006.01)
(Continued)

(52) U.S. Cl.
CPC ........ *G06K 9/4642* (2013.01); *E21B 41/0021* (2013.01); *E21B 41/0092* (2013.01);
(Continued)

(58) Field of Classification Search
CPC ............. G06K 9/4642; G06K 9/00637; G06K 9/00771; G06K 9/2018; E21B 41/0021; H04N 5/332
See application file for complete search history.

(56) References Cited

U.S. PATENT DOCUMENTS 8,288,726 B2   10/2012  Weil
8,599,264 B2   12/2013  Schmidt
(Continued)

FOREIGN PATENT DOCUMENTS

WO   WO-2013009715 A1 *  1/2013  ............. E21B 43/26
WO   WO-2014190081 A1 * 11/2014  ........... G06K 9/3241

OTHER PUBLICATIONS

Zhang, Hao and Chunhui Gu. "—1-Support Vector Machines versus Boosting." (2006) . . . (Year: 2006).*
(Continued)

*Primary Examiner* — Jamie J Atala
*Assistant Examiner* — Michael Robert Cammarata
(74) *Attorney, Agent, or Firm* — Rodney Warfford (57) ABSTRACT

Methods and apparatus are presented herein for detecting an oilfield equipment unit of an oilfield wellsite from a visible image, overlaying the detected oilfield equipment unit of the visible image on a corresponding portion of a thermal image, and generating an alert when a temperature indicated by the corresponding portion of the thermal image is outside of an operational temperature range of the detected oilfield equipment unit. The methods and apparatus presented herein facilitate the monitoring of the health of oilfield equipment units that would otherwise be monitored by numerous sensors disposed about the oilfield wellsite.

18 Claims, 5 Drawing Sheets

(51) Int. Cl.
    *G06K 9/20* (2006.01)
    *G06K 9/00* (2006.01)
    *H04N 5/33* (2006.01)
    *E21B 43/26* (2006.01)
    *G06K 9/62* (2006.01)
    *G08B 21/18* (2006.01)
    *H04N 7/18* (2006.01)
    *B64C 39/02* (2006.01)

(52) U.S. Cl.
    CPC .......... *E21B 43/26* (2013.01); *G06K 9/00637* (2013.01); *G06K 9/00771* (2013.01); *G06K 9/2018* (2013.01); *G06K 9/6269* (2013.01); *G08B 21/182* (2013.01); *H04N 5/33* (2013.01); *H04N 7/181* (2013.01); *B64C 39/024* (2013.01); *B64C 2201/127* (2013.01); *G06K 9/6257* (2013.01)

(56) References Cited

U.S. PATENT DOCUMENTS

| | | | | |
|---|---|---|---|---|
| 8,725,665 | B2* | 5/2014 | Anderson | G06Q 10/04 |
| | | | | 700/291 |
| 9,036,902 | B2 | 5/2015 | Nathan et al. | |
| 10,514,301 | B2* | 12/2019 | Luharuka | G01J 5/48 |
| 2007/0047839 | A1 | 3/2007 | Watanabe et al. | |
| 2009/0089709 | A1* | 4/2009 | Baier | G05B 19/409 |
| | | | | 715/817 |
| 2010/0127171 | A1 | 5/2010 | Jonsson et al. | |
| 2012/0141000 | A1* | 6/2012 | Jeanne | G06K 9/00496 |
| | | | | 382/128 |
| 2014/0002639 | A1* | 1/2014 | Cheben | G08B 21/14 |
| | | | | 348/135 |
| 2014/0229120 | A1* | 8/2014 | Luharuka | E21B 43/26 |
| | | | | 702/34 |
| 2015/0057562 | A1* | 2/2015 | Linders | G01K 1/026 |
| | | | | 600/549 |
| 2015/0316473 | A1* | 11/2015 | Kester | G06K 9/22 |
| | | | | 250/339.02 |
| 2015/0356482 | A1* | 12/2015 | Whipple | G06Q 10/06313 |
| | | | | 705/7.23 |
| 2015/0371115 | A1* | 12/2015 | Marchisio | G06F 16/29 |
| | | | | 382/159 |
| 2016/0148363 | A1* | 5/2016 | Phan | G06T 7/001 |
| | | | | 348/142 |
| 2016/0295208 | A1* | 10/2016 | Beall | G06T 7/80 |
| 2017/0314369 | A1* | 11/2017 | Rosano | F16P 3/142 |
| 2017/0322086 | A1* | 11/2017 | Luharuka | G01J 5/0037 |
| 2017/0364733 | A1* | 12/2017 | Estrada | G06N 3/04 |
| 2019/0213525 | A1* | 7/2019 | Haci | E21B 41/00 |
| 2019/0331301 | A1* | 10/2019 | Du | E01C 23/01 |

OTHER PUBLICATIONS

Schapire "A Brief Introduction to Boosting", Proceedings of the 16th International Joint Conference on Artificial Intelligence (1999). (Year: 1999).*

Boominathan et al., "Improving resolution and depth-of-field of light filed cameras using a hybrid imaging system", Computational Photography (ICCP) 2014 IEEE International Conference on. IEEE, 2014.

Dalal et al., "Human detection using oriented histograms of flow and appearance", Computer VisionECCV 2006, Springer Berlin Heidelberg, 2006, pp. 428-441.

Viola et al., "Rapid object detection using a boosted cascade of simple features", Computer Vision and Pattern Recognition, 2001, CVPR 2001, Proceedings of the 2001 IEEE Computer Society Conference on vol. 1 IEEE, 2001.

International Search Report and Written Opinion issued in International Patent Appl. No. PCT/US2016/035947 dated Sep. 21, 2016; 14 pages.

* cited by examiner

IMAGE-BASED WELLSITE EQUIPMENT HEALTH MONITORING

CROSS-REFERENCE TO RELATED APPLICATIONS

This application claims priority to and the benefit of U.S. Provisional Application No. 62/171,993, titled "Method of Detection of Equipment and Related Components from Visual Image," filed Jun. 5, 2015, the entire disclosure of which is hereby incorporated herein by reference.

BACKGROUND OF THE DISCLOSURE

Wellsite equipment used for oilfield operations may include positive displacement pumps, sometimes referred to as reciprocating pumps, which may be used for pumping fluids into a wellbore and the surrounding reservoir. A reciprocating pump having multiple pump chambers that each receive a reciprocating plunger (e.g., a multiplex pump) may be used in hydraulic fracturing, where a proppant-laden fluid is pumped down a wellbore at, for example, up to twenty barrels per minute at pressures up to 20,000 psi. Multiple pumps, for example, up to 36 multiplex pumps, may be connected together along a common line at the wellsite to produce a pumping system for outputting the desired volume and pressure. The pumps and other wellsite equipment are moved to the wellsite on semi-trailer trucks or the like.

To monitor the health of the wellsite equipment, sensors may be placed along areas of the equipment having relatively higher propensity for failure. For example, sensors may be placed on high-pressure equipment, for example, in areas near multiplex pumps, and along pipes or other areas containing fluid flow. Such sensors may measure flow rate, temperature, pressure, vibration, and/or other parameters used, for example, to monitor and predict failures of the wellsite equipment. However, for large scale oilfield operations, such as in hydraulic fracturing operations, the number of sensors used to monitor the operation and health of the entire system may be in the thousands, which can exacerbate the reliability and maintainability of the wellsite equipment and system, as well as the complexity of the sensor data acquisition and analysis.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a processing system. The processing system includes a processor and a memory including computer program code. The processing system is operable to detect an equipment unit of a wellsite from a visible image, overlay the detected equipment unit of the visible image on a corresponding portion of a thermal image, and generate an alert when a temperature indicated by the corresponding portion of the thermal image is outside of an operational temperature range of the detected equipment unit.

The present disclosure also introduces an apparatus including a first image-capturing device operable to capture a visible image, a second image-capturing device operable to capture a thermal image, a control center corresponding to a worksite and communicatively coupled to the first image-capturing device and the second image-capturing device, and a processing system including a processor and a memory including computer program code. The processing system is operable to identify an equipment unit of the worksite from the visible image, correspond at least one portion of the thermal image to the equipment unit in the visible image, and generate an alarm when the portion(s) of the thermal image corresponding to the equipment unit indicates a temperature of the equipment unit is outside of an operational temperature range of the equipment unit.

The present disclosure also introduces a method including operating a processing system that includes a processor and a memory including computer program code. Operating the processing system includes detecting an equipment unit at a worksite from a visible image, matching at least one portion of a thermal image to the detected equipment unit of the visible image, and outputting an alarm when the portion(s) of the thermal image indicates a temperature outside of an operational temperature range of the equipment unit.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed.

As introduced herein, a health monitoring system may be able to monitor the health of one or more equipment units at a worksite. In some examples, the health monitoring system uses a visible image and a thermal image to identify an equipment unit and determine the thermal status of the equipment unit. If the thermal status of the equipment unit is in an abnormal state, an alert or alarm may be generated such that maintenance or other remedial actions may be taken with respect to the equipment unit. In some examples, by using imaging to detect health of equipment, a more unified monitoring system may be implemented, and fewer sensors on various equipment units, and with corresponding wired connections between the equipment units and a control center, may be used.

Some examples described herein are in the context of a hydraulic fracturing well site in the oil and gas industry. A health monitoring system may be utilized with various types of physical equipment units such as equipment units at an oilfield wellsite or at other worksites such as, without limitation, a manufacturing facility and a construction site. In an oilfield environment, the physical equipment units can be located at a wellsite that can be either onshore or offshore. Other implementations can be in the context of other worksites and/or outside of the oil and gas industry.

Figure 1:
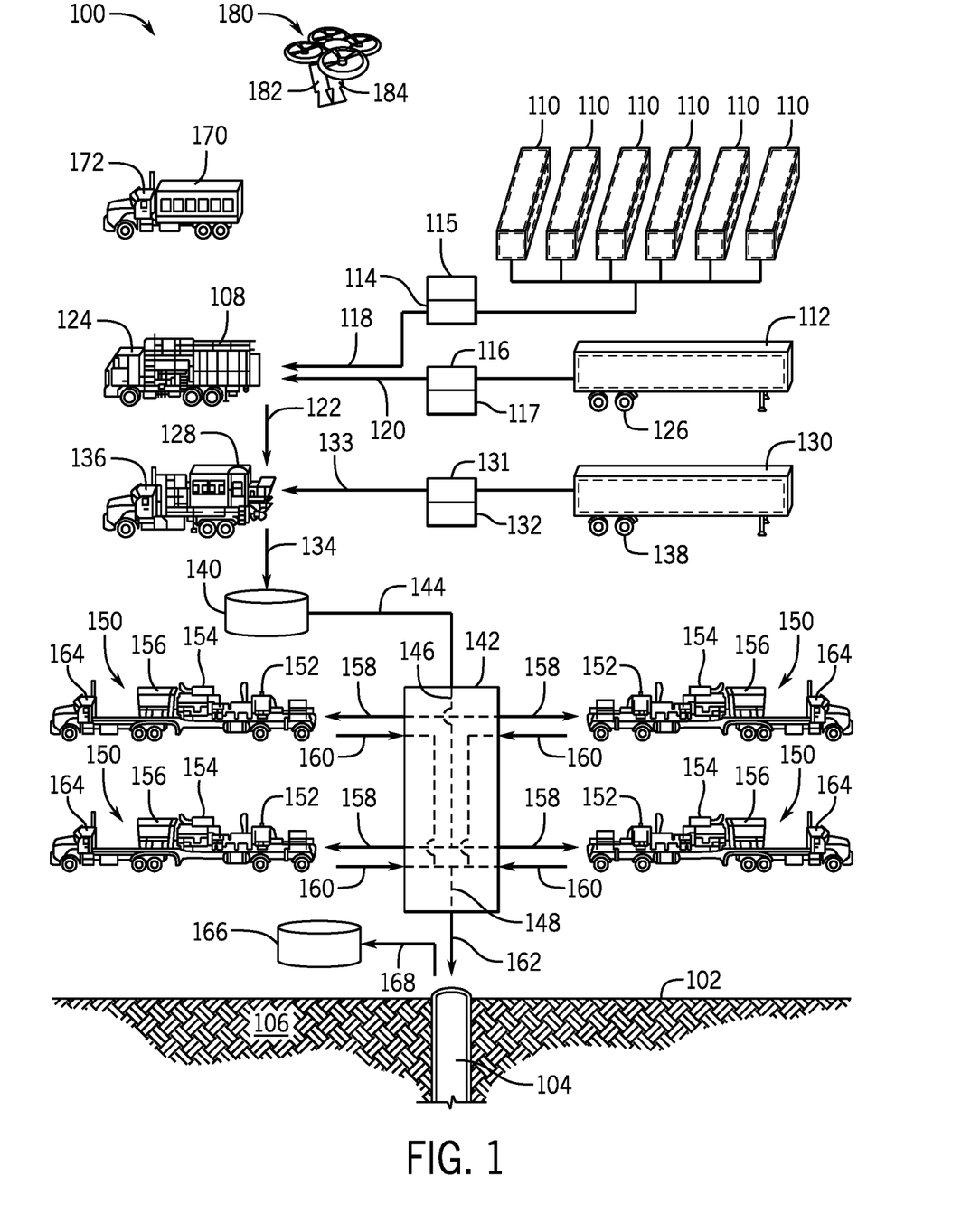
FIG. 1 is a schematic view of at least a portion of an example implementation of apparatus according to one or more aspects of the present disclosure.

FIG. 1 is a schematic view of at least a portion of an example implementation of an additive system 100 at an oilfield wellsite that provides an example environment for a health monitoring system according to one or more aspects of the present disclosure. The oilfield wellsite can be a hydraulic fracturing wellsite or another wellsite. The figure depicts a wellsite surface 102 adjacent to a wellbore 104 and a partial sectional view of a subterranean formation 106 penetrated by the wellbore 104 below the wellsite surface 102. The additive system 100 may be operable to transfer an additive or other material from a source location to a destination location for blending or mixing with another additive or material and eventual injection into the wellbore 104.

The additive system 100 may comprise a first mixer 108 connected with one or more first containers 110 and a second container 112. The second container 112 may contain a first additive and the first containers 110 may contain water or another liquid comprising water. When the additive system 100 is operable as a fracturing system, the first additive may be or comprise a hydratable material or gelling agent, such as guar, a polymer, a synthetic polymer, a galactomannan, a polysaccharide, a cellulose, and/or a clay, among other examples, and the liquid may be or comprise an aqueous fluid, which may comprise water or an aqueous solution comprising water, among other examples. When the additive system 100 is operable as a cementing system, the first additive may be or comprise cement powder.

The liquid may be transferred from the first containers 110 to the first mixer 108 by a first material transfer device 114, such as may be driven by a first prime mover 115. The first material transfer device 114 may be or comprise a pump, while the first prime mover 115 may be or comprise an electric motor, an engine, or another rotary actuator. The first additive may be transferred from the second container 112 to the first mixer 108 by a second material transfer device 116, such as may be driven by a second prime mover 117. The second material transfer device 116 may be or comprise a conveyer, a bucket elevator, or a feeding screw, while the second prime mover 117 may be or comprise an electric motor, an engine, or another rotary actuator. The first mixer 108 may be operable to receive the first additive and the liquid via two or more conduits 118, 120, and mix or otherwise combine the first additive and the liquid to form a base fluid. The first mixer 108 may then discharge the base fluid via one or more conduits 122.

The first mixer 108 and the second container 112 may each be disposed on corresponding trucks, trailers, and/or other mobile carriers 124, 126, respectively, to permit their transportation to the wellsite surface 102. However, the first mixer 108 and/or second container 112 may be skidded or otherwise stationary, and/or may be temporarily or permanently installed at the wellsite surface 102.

The additive system 100 may further comprise a second mixer 128 fluidly connected with the first mixer 108 and a third container 130. The third container 130 may contain a second additive that may be substantially different than the first additive. When the additive system 100 is operable as the fracturing system, the second additive may be or comprise a proppant material, such as sand, sand-like particles, silica, quartz, and/or propping agents, among other examples. When the additive system 100 is operable as the cementing system, the second additive may be or comprise accelerators, retarders, fluid-loss additives, dispersants, extenders, weighting agents, lost circulation additives and/or other chemicals or materials operable to modify the characteristics of the base fluid. The second additive may be a solid material (e.g., particulate material, powder) or a liquid.

The second additive may be transferred from the third container 130 to the second mixer 128 by a third material transfer device 131 driven by a third prime mover 132. The third material transfer device 131 may be or comprise a pump when the second additive is a liquid, or the third material transfer device 131 may be or comprise a conveyer, a bucket elevator, or a feeding screw when the second additive is a solid material. The third prime mover 132 may be or comprise an electric motor, an engine, or another rotary actuator. The second mixer 128 may be operable to receive the base fluid from the first mixer 108 via one or more conduits 122, and a second additive from the third container 130 via one or more conduits 133, and mix or otherwise combine the base fluid and the second additive to form a mixture. The mixture may comprise a fracturing fluid when the additive system 100 is operable as the fracturing system, or the mixture may comprise a cement slurry when the additive system 100 is operable as the cementing system. The second mixer 128 may then discharge the mixture via one or more conduits 134.

The second mixer 128 and the third container 130 may each be disposed on corresponding trucks, trailers, and/or other mobile carriers 136, 138, respectively, to permit their transportation to the wellsite surface 102. However, the second mixer 128 and/or third container 130 may be skidded or otherwise stationary, and/or may be temporarily or permanently installed at the wellsite surface 102.

The mixture may be communicated from the second mixer 128 to a fourth container 140, which may be or comprise a mixing, displacement, or storage tank for the mixture prior to being injected into the wellbore 104. The mixture may be communicated from the fourth container 140 to a common manifold 142 via the one or more conduits 144. The common manifold 142 may comprise a combination of valves and/or diverters, as well as a suction line 146 and a discharge line 148, such as may be collectively operable to direct flow of the mixture in a selected or predetermined manner. The common manifold 142, which may be known in the art as a missile or a missile trailer, may distribute the mixture to a pump fleet. The pump fleet may comprise multiple pump assemblies 150 each comprising a pump 152, a prime mover 154, and a heat exchanger 156. Each pump assembly 150 may receive the mixture from the suction line 146 of the common manifold 142, via one or more conduits 158, and discharge the mixture under pressure to the discharge line 148 of the common manifold 142, via one or more conduits 160.

The pump assemblies 150 may each be mounted on corresponding trucks, trailers, and/or other mobile carriers 164, such as may permit their transportation to the wellsite surface 102. However, the pump assemblies 150 may be skidded or otherwise stationary, and/or may be temporarily or permanently installed at the wellsite surface 102.

The mixture may then be discharged from the common manifold 142 into the wellbore 104 via one or more conduits 162, such as may include various valves, conduits, and/or other hydraulic circuitry fluidly connected between the common manifold 142 and the wellbore 104. During operations, the mixture and/or wellbore fluid may be ejected from the wellbore 104 and communicated to a fifth container 166 via one or more conduits 168. Although the additive system 100 is shown comprising a fourth container 140, it is to be understood that the fourth container 140 may not be included as part of the additive system 100, such that the mixture may be communicated from the second mixer 128 directly to the common manifold 142. The additive system 100 may also omit the common manifold 142, and the conduits 160 may be fluidly connected to the wellbore 104 via a wellhead (not shown) and/or other means.

The additive system 100 may also comprise a control center 170, which may be operable to monitor and control at least a portion of the additive system 100 during operations. Signals may be communicated between the control center 170 and other components of the additive system 100 via a communication system including wired connections, wireless communication such as using an aerial mobile communication vehicle, or a combination of these. For example, the control center 170 may be operable to monitor and/or control the production rate of the mixture, such as by increasing or decreasing the flow of the liquid from the first containers 110, the first additive from the second container 112, the base fluid from the first mixer 108, the second additive from the third container 130, and/or the mixture from the second mixer 128.

The control center 170 may also be operable to monitor health and/or functionality of the additive system 100. For example, the control center 170 may be operable to monitor and/or control operational parameters associated with the containers 110, 112, 130, 140, 166, the first and second mixers 108, 128, the material transfer devices 114, 116, 131, and/or the pump assemblies 150. The control center 170 may also be operable to monitor temperature, viscosity, density, and composition of the liquid contained in the first containers 110, the first additive, the second additive, and/or the mixture.

The control center 170 may also communicate with communication devices to permit a supervisor to assign tasks to field personnel to operate the additive system 100, or portions thereof, based on information (e.g., visual information) shared therebetween. Control signals may be communicated between the control center 170 and other wellsite equipment units via electric conductors (not shown). Control signals may also be communicated between the control center 170 and the communication devices associated with the field personnel operating the wellsite equipment units via a communication path (e.g., a wireless communication path). Currently known and future-developed types of signal communication are within the scope of the present disclosure.

The control center 170 may be disposed on a corresponding truck, trailer, cabin, and/or other mobile carrier 172, such as may permit its transportation to the wellsite surface 102. However, the control center 170 may be skidded or otherwise stationary, and/or may be temporarily or permanently installed at the wellsite surface 102.

The additive system 100 further includes a first image-capturing device 182 and a second image-capturing device 184 mounted on an aerial mobile vehicle 180 (e.g., a drone). The first image-capturing device 182 and the second image-capturing device 184 are operable to capture images of various equipment units of the additive system 100. The first image-capturing device 182 may be a camera that captures visible images, such as at a resolution of at least eight megapixels. The second image-capturing device 184 may be a camera that captures thermal images, such as an infrared camera. Examples of a second image-capturing device 184 may include, but are not limited to, the FLIR GF300/320, FLUKE Ti40FT IR FLEX CAM, or other thermal imaging device having a detectable temperature range between about −2° C. and about 350° C. Other thermal imaging devices known in the art may be used with a broader or narrower temperature range suitable for the particular application, or perhaps with improved detector resolution and accuracy. The thermal imaging device may be a stereoscopic camera. The second image-capturing device 184 may have a resolution lower than a resolution of the first image-capturing device 182, while in other examples, the second image-capturing device 184 may have a resolution equal to or greater than the resolution of the first image-capturing device 182.

The first image-capturing device 182 and the second image-capturing device 184 are physically mounted on the aerial mobile vehicle 180 with a known physical relationship between the first image-capturing device 182 and the second image-capturing device 184. For example, a distance between the two image-capturing devices 182, 184 and an orientation and/or relative angle of view between the two image-capturing devices 182, 184 may be known. Generally, images captured by the image-capturing devices 182, 184 are used to identify one or more equipment units of the additive system 100 and monitor the health of that equipment unit(s), including abnormalities in the operating temperature, as discussed in example methods below. The image-capturing devices 182, 184 as shown in FIG. 1 are on an aerial mobile vehicle 180 such that an angle of view of images and distance from the wellsite when images are captured may vary, e.g., the image-capturing devices 182, 184 may be in different positions at different times when images are captured. In other example implementations, the image-capturing devices 182, 184 may be mounted on a fixed structure, such as a tower, derrick, pole, building, natural feature (e.g., a cliff or hill), or the like. Additionally, the image-capturing devices 182, 184 may capture images from various distances away from one or more equipment units that are being monitored, and the images may include each of the operating equipment units at the wellsite, some of the operating equipment units at the wellsite, or a single equipment unit at the wellsite.

FIG. 1 depicts the additive system 100 as being operable to transfer additives and produce mixtures that may be pressurized and injected into the wellbore 104 during hydraulic fracturing or cementing operations. However, it is to be understood that the additive system 100 may be operable to transfer other additives and produce other mixtures that may be pressurized and injected into the wellbore 104 during other oilfield operations, such as drilling, acidizing, chemical injecting, and/or water jet cutting operations, among other examples. While the health monitoring system as described herein will be described in the environment of a hydraulic fracturing system, it is to be understood that the health monitoring system may be implemented during other oilfield operations, such as drilling, cementing, acidizing, chemical injecting, and/or water jet cutting operations, among other examples, and other job site operations, such as in other industries.

Figure 2:
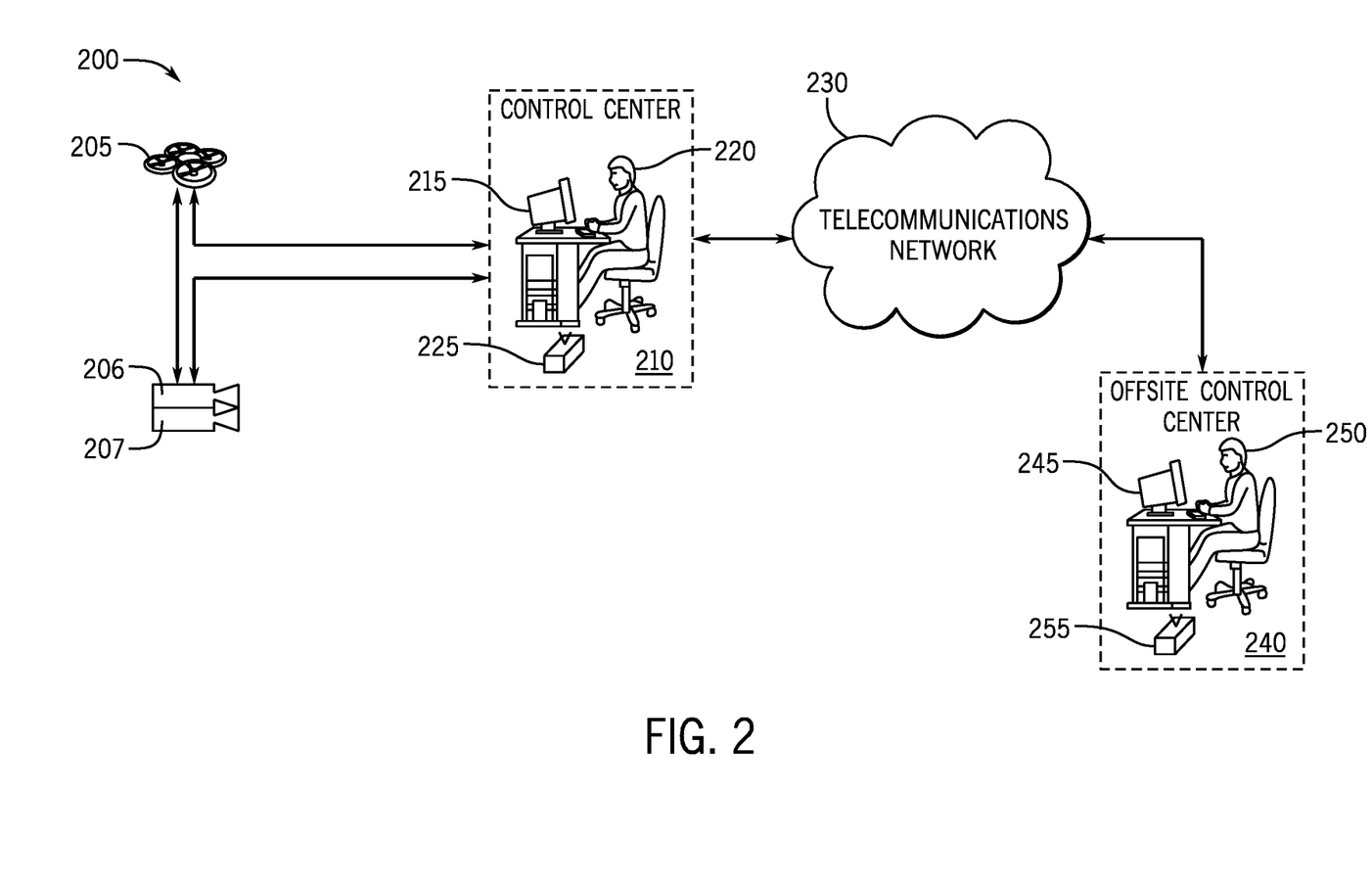
FIG. 2 is a schematic view of at least a portion of an example implementation of apparatus according to one or more aspects of the present disclosure.

FIG. 2 is a system level view of at least a portion of an example implementation of a health monitoring system 200 according to one or more aspects of the present disclosure. The health monitoring system 200 shown in FIG. 2 illustrates various communication paths for communicating between different components. More or fewer communication paths may be implemented in different examples, such as with a different implementation of components.

The health monitoring system 200 includes a control center 210 (e.g., control center 170 in FIG. 1) including a computer 215 operated by a supervisor 220 at an oilfield wellsite. The computer 215 can send information to and receive information from a remote location via a communications router 225 (e.g., a wireless communications router) of the control center 210. The communications router 225 can serve as an access point for communication device(s) and/or aerial mobile vehicle(s) at the oilfield wellsite, as well as a gateway to permit the control center 210 to communicate with remote communication device(s) and/or offsite control center(s).

The control center 210 can communicate with a first image-capturing device 206 (e.g., the first image-capturing device 182 in FIG. 1) and a second image-capturing device 207 (e.g., the second image-capturing device 184 in FIG. 1) individually or together. The communication between the control center 210 and the image-capturing devices 206, 207 can be by a wireless communication path, a wired communication path, or a combination thereof. For example, when the image-capturing devices 182, 184 are mounted on an aerial mobile vehicle 180 as shown in FIG. 1, the communication may be by a wireless communication path. In another example, if the image-capturing devices 182, 184 are mounted on a fixed structure, the communication may be by a wired communication path or other type of communication path.

The control center 210 can also communicate with an aerial mobile vehicle 205 (e.g., the aerial mobile vehicle 180 in FIG. 1). The communication between the control center 210 can be by a wireless communication path, although a wired communication path or a combination of wired and wireless communication path may be used.

Additionally, the aerial mobile vehicle 205 can communicate with the image-capturing devices 206, 207. The communication between the aerial mobile vehicle 205 and the image-capturing devices 206, 207 may be by a wireless communication path, a wired communication path, or a combination thereof. In some examples, the image-capturing devices 206, 207 are mounted on the aerial mobile vehicle 205 and communicate with the aerial mobile vehicle 205 by a wired connection, such as using a Universal Serial Bus (USB) connection and protocol or the like, by a wireless connection, such as Bluetooth or Wi-Fi, or the like. In those examples, communication between the aerial mobile vehicle 205 and the control center 210 and between the image-capturing devices 206, 207 and the control center 210 may be by a wireless connection, such as Wi-Fi, WiMAX, or the like. By enabling communication between the image-capturing devices 206, 207 and the control center 210, between the aerial mobile vehicle 205 and the control center 210, and between the image-capturing devices 206, 207 and the aerial mobile vehicle 205, redundancy of communication paths may be achieved. Other examples within the scope of this disclosure may include no redundancy of communication paths.

The control center 210 can communicate with an offsite computer 245 operated by an offsite supervisor 250 at an offsite control center 240 via a communications router 255 coupled to a telecommunications network 230. The offsite control center 240 may be associated with another wellsite. The offsite control center 240 may maintain a database of information corresponding to one or more equipment units at one or more wellsites. The control center 210 may communicate information about the operation of the wellsite and equipment unit(s) therein to the offsite control center 240. The offsite control center 240 may have an enterprise perspective of multiple wellsites and may maintain historical information of the operation of the wellsites and equipment unit(s) in the database.

One of ordinary skill in the art will readily understand how communications as described above may be implemented, including the hardware within the various illustrated components and/or intervening between the various illustrated components, and hence, further details are omitted for brevity. Currently known and future-developed types of communication are within the scope of the present disclosure.

Figure 3:
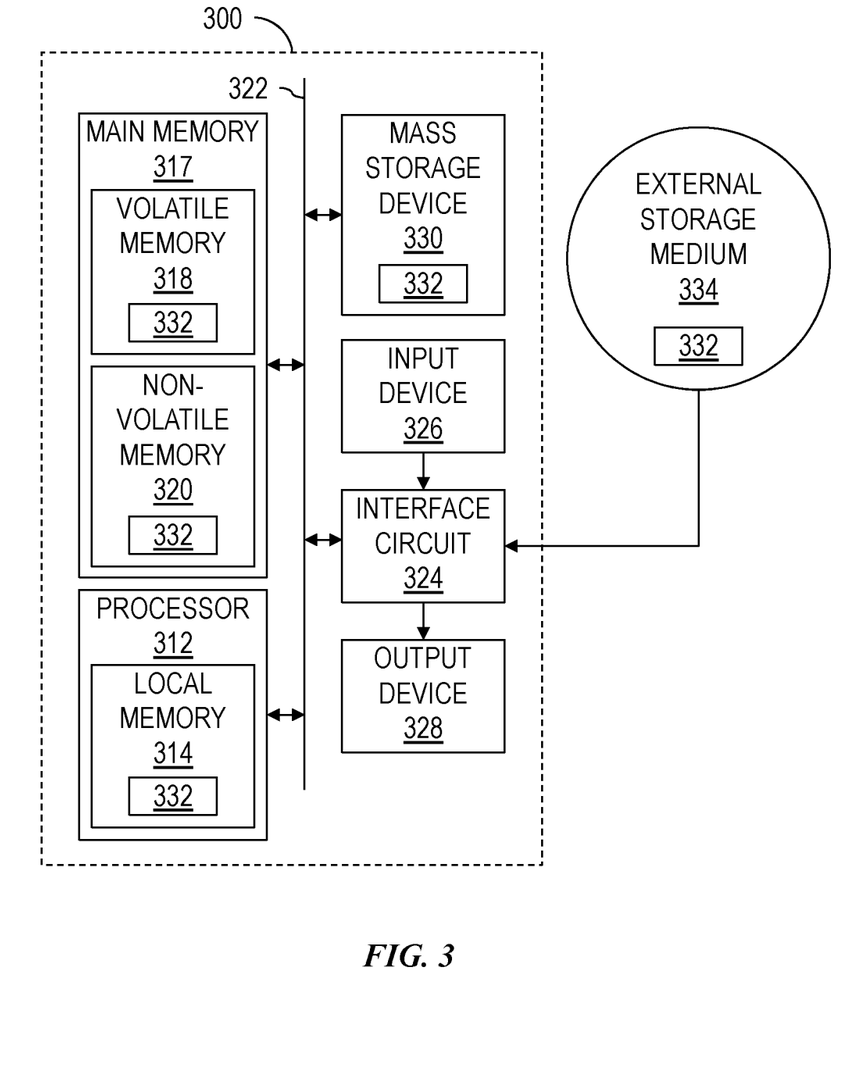
FIG. 3 is a schematic view of at least a portion of an example implementation of apparatus according to one or more aspects of the present disclosure.

FIG. 3 is a schematic view of at least a portion of an apparatus of a health monitoring system according to one or more aspects of the present disclosure. The apparatus may form at least a portion of a communication device, computer, and/or aerial mobile vehicle, among other things, of the health monitoring system. The apparatus is or comprises a processing system that may further include one or more processing devices 300 that may execute example machine-readable instructions to implement at least a portion of one or more of the methods and/or processes described herein. In some examples, the processing system may be one processing device 300 that implements the example methods and processes described herein. In other examples, the processing system and various functionalities may be distributed across multiple different processing devices 300. For example, functionality of various methods or processes described herein, as implemented by program instructions or computer program code executed by an associated processor, may be performed across multiple different processing devices 300, such the image-capturing devices 206, 207, aerial mobile vehicle 205, and computers 215, 245 shown in FIG. 2.

The processing device 300 may be or comprise, for example, one or more processors, controllers, special-purpose computing devices, servers, personal computers, personal digital assistant (PDA) devices, smartphones, smart glasses, tablets, internet appliances, and/or other types of computing devices. Moreover, while it is possible that the entirety of the processing device 300 shown in FIG. 3 is implemented within the apparatus, it is also contemplated that one or more components or functions of the processing device 300 may be external to the processing device 300.

The processing device 300 may comprise a processor 312 such as, for example, a general-purpose programmable processor. The processor 312 may comprise a local memory 314, and may execute coded instructions 332 present in the local memory 314 and/or another memory device. The processor 312 may execute, among other things, machine-readable instructions or programs to implement the methods and/or processes described herein. The programs stored in the local memory 314 may include program instructions or computer program code that, when executed by an associated processor, enable health monitoring of one or more equipment units as described herein. The processor 312 may be, comprise, or be implemented by one or a plurality of processors of various types suitable to the local application environment, and may include one or more of general- or special-purpose computers, microprocessors, digital signal processors (DSPs), field-programmable gate arrays (FPGAs), application-specific integrated circuits (ASICs), and processors based on a multi-core processor architecture, as non-limiting examples. Other processors from other families are also appropriate.

The processor 312 may be in communication with a main memory, such as may include a volatile memory 318 and a non-volatile memory 320, perhaps via a bus 322 and/or other communication means. The volatile memory 318 may be, comprise, or be implemented by tangible, non-transitory storage, such as random access memory (RAM), static random access memory (SRAM), synchronous dynamic random access memory (SDRAM), dynamic random access memory (DRAM), RAMBUS dynamic random access memory (RDRAM) and/or other types of random access memory devices. The non-volatile memory 320 may be, comprise, or be implemented by tangible, non-transitory storage, such as read-only memory, flash memory and/or other types of memory devices. Various types of tangible, non-transitory memory or storage device may be implemented as the volatile memory 318 and the non-volatile memory 320. One or more memory controllers (not shown) may control access to the volatile memory 318 and/or the non-volatile memory 320.

The processing device 300 may also comprise an interface circuit 324. The interface circuit 324 may be, comprise, or be implemented by various types of standard interfaces, such as an Ethernet interface, a universal serial bus (USB), a third generation input/output (3GIO) interface, a wireless interface, a satellite interface, a global positioning system (GPS) and/or a cellular interface or receiver, among others. The interface circuit 324 may also comprise a graphics driver card. The interface circuit 324 may also comprise a device such as a modem or network interface card to facilitate exchange of data with external computing devices via a network (e.g., Ethernet connection, digital subscriber line (DSL), telephone line, coaxial cable, cellular telephone system, satellite, etc.).

One or more input devices 326 may be connected to the interface circuit 324. The input device(s) 326 may permit a user to enter data and commands into the processor 312. The input device(s) 326 may be, comprise, or be implemented by, for example, a keyboard, a mouse, a touchscreen, a track-pad, a trackball, an isopoint, and/or a voice recognition system, among others. The input device(s) 326 may comprise an image-capturing device configured to capture an image or video and provide visual content of field equipment unit(s) at a worksite and/or a sensor configured to capture operating parameters at the worksite.

One or more output devices 328 may also be connected to the interface circuit 324. The output devices 328 may be, comprise, or be implemented by, for example, display devices (e.g., a light-emitting diode (LED) display, a liquid crystal display (LCD, or a cathode ray tube (CRT) display, among others), printers, and/or speakers, among others.

The processing device 300 may also comprise one or more mass storage devices 330 for storing machine-readable instructions and data. Examples of such mass storage devices 330 include tangible, non-transitory storage, such as floppy disk drives, hard drive disks, compact disk (CD) drives, and digital versatile disk (DVD) drives, among others. The coded instructions 332 may be stored in the mass storage device 330, the volatile memory 318, the non-volatile memory 320, the local memory 314, and/or on a removable storage medium 334, such as a CD or DVD. Thus, the modules and/or other components of the processing device 300 may be implemented in accordance with hardware (embodied in one or more chips including an integrated circuit such as an ASIC), or may be implemented as software or firmware for execution by a processor. In particular, in the case of firmware or software, the embodiment can be provided as a computer program product including a computer readable medium or storage structure embodying computer program code (i.e., software or firmware) thereon for execution by the processor.

The following methods or processes may be for health monitoring at a worksite, such as a hydraulic fracturing wellsite or another worksite. The methods or processes are discussed in the context of devices and components discussed above with respect to the foregoing figures, although in other implementations, methods or processes within the scope of this disclosure may be performed in the context of other devices and components. The methods or processes discussed below are illustrated in a given order, and in other implementations, methods or processes may be performed in other orders within the scope of the present disclosure. For example, some aspects may be performed in different orders or in parallel, among others. Further, consistent with the scope of this disclosure, various other modifications may be made to the methods or processes discussed below. For example, some implementations may use different algorithms or processes from what is discussed below. Additionally, methods or processes within the scope of this disclosure may include additional or fewer determinations, computations, logic, monitoring, etc.

Figure 4:
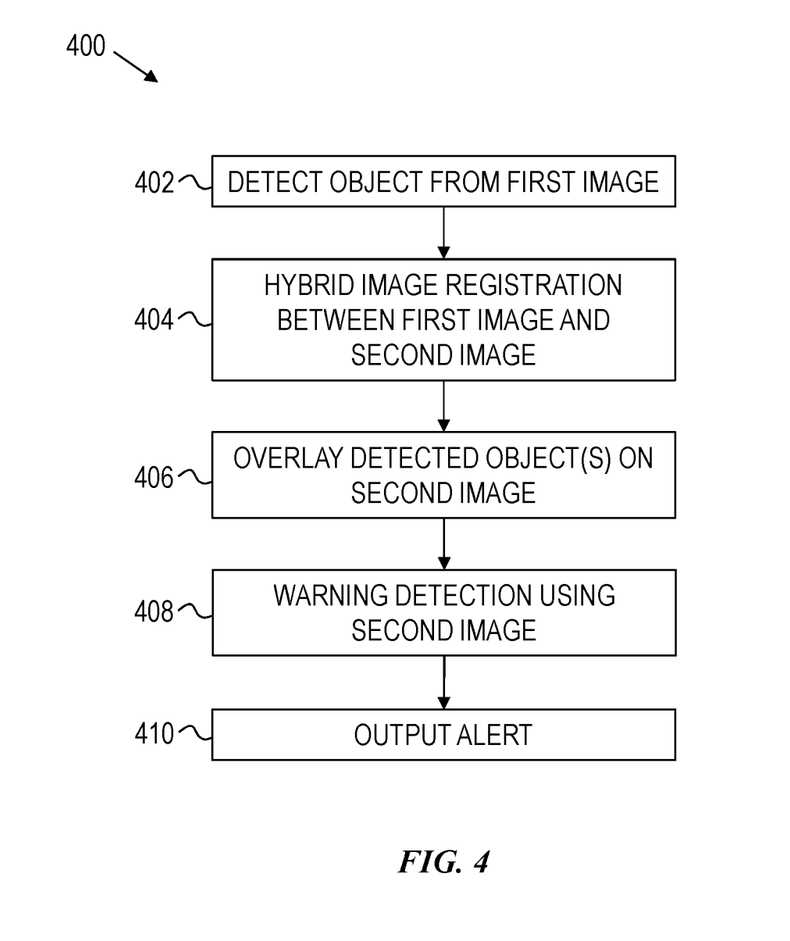
FIG. 4 is a flow-chart diagram of at least a portion of an example implementation of a method according to one or more aspects of the present disclosure.

FIG. 4 is a flow-chart diagram of at least a portion of an example implementation of a method (400) according to one or more aspects of the present disclosure. The method (400) is operable to, at least in part, determine a health condition of one or more equipment units of a worksite. The method (400) can be implemented by a data processing system, such as discussed above with respect to FIG. 3.

An object is detected (402) from a first image of the worksite. The first image may have been captured by a first image-capturing device, such as the first image-capturing device 182 being utilized to capture a first image of the wellsite depicted in FIG. 1. The first image can be of a visible image (i.e., a photograph) and may be a high-resolution image, such as at a resolution of at least eight megapixels. The object detected (402) from the first image can be one or more equipment units. The object detection (402) can use a known or future-developed object detection algorithm. An example object detection algorithm is provided below in the context of FIGS. 5 and 6. The object detection (402) can be performed with or without using markers to identify an equipment unit. Such markers may include infrared emitters and retroreflective material.

With objects detected (402) in the first image, an equipment unit can be specifically identified (such as by equipment, serial, model, and/or other number/identifier) using business rules associated with the worksite. The business rules may determine, for example, a numbering scheme of equipment units based on orientation relative to a given point and/or specified equipment unit at the worksite. In an example hydraulic fracturing wellsite as shown in FIG. 1, a unique equipment unit associated with the location of the wellbore 104 may be identified by the object detection (402) and can be used as a basis for numbering specific types of equipment units. As an example, a business rule for numbering trucks, trailers, and/or other mobile carriers 164 with pump assemblies 150 (hereinafter, "trucks 164" for convenience) may be that the nearest, leftmost truck 164 when viewing the group of trucks 164 from the location of the wellbore 104 may be numbered Truck 1, and other trucks 164 are numbered incrementally in a counter-clockwise direction from Truck 1. In the hydraulic fracturing wellsite example, the business rules for identifying the equipment units may be the same rules used for a rig-up plan for setting up and configuring equipment units at the wellsite. If the equipment unit(s) detected from the first image is consistent with the rig-up plan, an additional level of confidence may be gained from the object detection (402).

The method (400) also includes a hybrid image registration (404) between the first image and a second image. For example, the second image may have been captured by a second image-capturing device, such as the second image-capturing device 184 being utilized to capture a second image of the wellsite depicted in FIG. 1. The second image can be a thermal image, such as an infrared image, and may have a resolution that varies within the scope of the present disclosure, such as having a lower resolution than the first image. The hybrid image registration (404) can determine which pixel(s) in one image correspond or match with pixel(s) in another image. The hybrid image registration (404) can be a cross-modal registration when the first image is a visible image and the second image is a thermal image. The hybrid image registration (404) can use a known or future-developed image registration algorithm.

In an example, and in the context of the data processing system as discussed above in FIG. 3 and the systems of FIGS. 1 and 2, the data processing system may receive the first and second images (whether in raw form or otherwise) from the respective first and second image-capturing devices, such as via wired or wireless communication paths directly or indirectly between the image-capturing devices 206, 207 and the control center 210, including implementations in which the data processing system is within the control center 210. However, one or both of the image-capturing devices may perform one or more aspects of the methods described herein, such as when the image-capturing devices form respective portions of a distributed data processing system.

The second image is overlaid (406) with the object(s) detected (402) in the first image. For example, the whole first image may be overlaid on the second image, or the determined (402) object(s) of the first image may be overlaid on the second image. The hybrid image registration (404) permits translation of the first image onto the space of the second image, thus providing a correspondence between the physical objects, thermal signatures, and/or other features captured by the images. By overlaying a visual image onto a thermal image, for example, a thermal signature for a physical object in the visual image can be determined.

The method (400) may also include detecting (408) a warning or other abnormality using the overlaid (406) images. With the type of equipment unit and/or specific equipment unit number determined, a normal operational temperature may be assigned to each equipment unit. For example, a radiator for a pump assembly 150 on a truck 164 may have a normal operational temperature that ranges between about 50° C. and about 100° C., among other examples. A thermal signature can be determined from the thermal image by determining a statistical average of the intensities of the pixels of the thermal image corresponding to the detected (402) object(s) of the first image, for example. If the thermal signature associated with that equipment unit from the second image, and through the hybrid image registration (404) indicates a temperature outside of the normal operational temperature range, a warning can be implemented for that equipment unit. The normal operational temperature range can be a manufacturer-provided or other predetermined temperature range appropriate for a given equipment unit. A warning can be implemented when the thermal signature for the given equipment unit is above or below the normal operational temperature range, perhaps including different types of warnings to indicate whether the detected thermal signature is above or below the normal range.

Some example equipment units for which health may be monitored at a hydraulic fracturing worksite are depicted in FIG. 1, such as a heat exchanger 156 (e.g., radiator) on a pump assembly 150, a pipe network through which fluid flows, a prime mover 154 (including a crankshaft, bearing raceways, etc.) on a pump assembly 150, a pump 152 (e.g., including reciprocating plungers) on a pump assembly 152, mixers 108, 128, an electrical generator, an engine, a radiator, an exhaust, an injector head, a transmission, etc. Different types of equipment units may have different expected, normal operational temperature ranges. A warning can be implemented when the temperature indicated for a given equipment unit is abnormal compared to the normal operational temperature range for that given equipment unit.

The method (400) may also include outputting (410) an alert. The warning generated for the equipment unit via the above-described image processing may be collated with other sensors associated with the equipment unit. These sensors can be sensors that are on-board the equipment unit. The warning from the image processing can be used to check the accuracy of the on-board sensors, or vice versa. The warning from the image processing can be stored in a database for subsequent analysis of historical events for given equipment unit(s). The alert can be output (410) when the warning is generated, and/or when the warning is confirmed by other on-board sensors. The alert can be output (410) to an operator or other personnel who can investigate the equipment unit corresponding to the alert, and can take remedial actions when appropriate.

Figure 5:
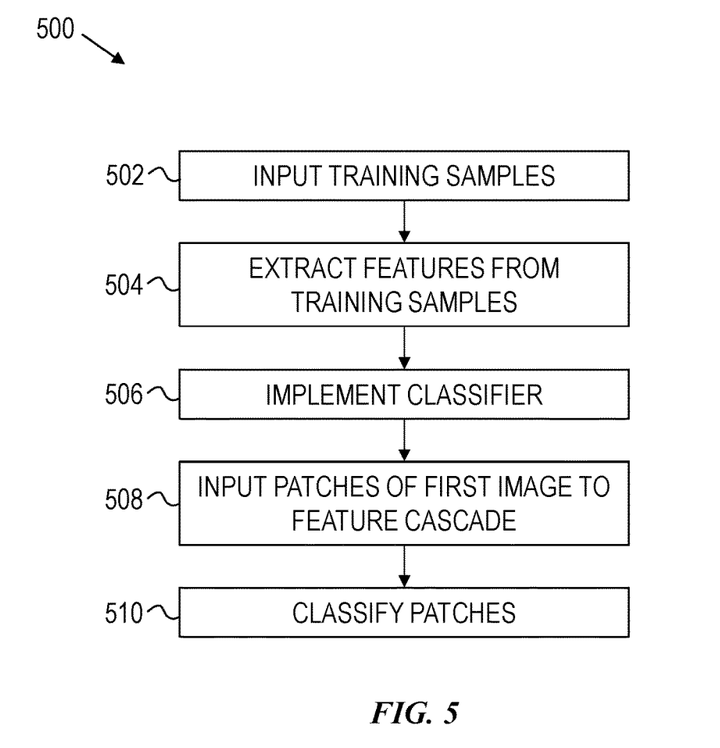
FIG. 5 is a flow-chart diagram of at least a portion of an example implementation of a method according to one or more aspects of the present disclosure.

FIG. 5 is a flow-chart diagram of at least a portion of at least a portion of a method (500) according to one or more aspects of the present disclosure. The method (500) is operable to detect objects in an image, such as for the object detection (402) described above. However, the method (500) is an example for object detection, and other implementations within the scope of the present disclosure can use object detection processes and algorithms that are different from, or in addition to, the object detection described above with respect to FIG. 4.

The method (500) includes the input (502) of training samples. The training samples can include images and patches, windows, sub-windows, and/or other portions of images (collectively referred to hereafter as simply "images") that depict objects to be detected, as well as images that depict objects that are not to be detected. The images that depict objects to be detected are positive training samples. The images that depict objects that are not to be detected are negative training samples. For example, referring again to the hydraulic fracturing wellsite example of FIG. 1, positive training samples could include multiple different images (perhaps with different scales, orientation, etc.) of radiators of pumps 150 on the trucks 164, and negative training samples could include multiple different images (also perhaps with different scales, orientation, etc.) of trees, grass, roads, equipment units, and/or objects that are not to be detected.

The method (500) also includes extracting (504) features from the input (502) training samples. For example, histograms of oriented gradient (HOG) descriptors may be used to extract (504) features from the training samples. The HOG descriptors may determine gradient orientation of features, whether in positive or negative training samples, that can be used in object detection.

Figure 6:
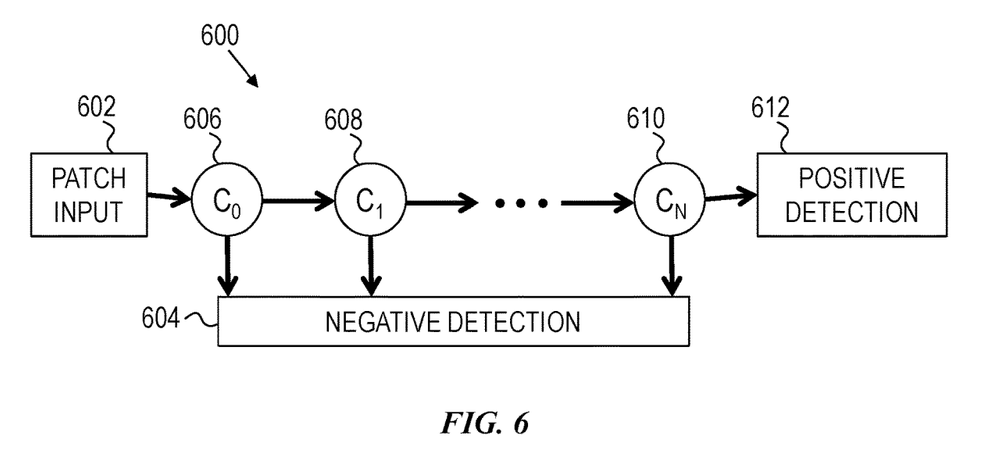
FIG. 6 is a flow-chart diagram of at least a portion of an example implementation of a method according to one or more aspects of the present disclosure.

A classifier may be implemented (506) using the features that are extracted (504) from the training samples. The classifier can be a machine learning algorithm, such as a support vector machine (SVM) or the like. An example classifier that may be implemented (506) is illustrated in FIG. 6 and discussed in more detail below. Different classifiers can be used to detect different equipment units.

The training samples may be stored in a database separate and remote from a data processing system on which object detection may occur. Additionally, a data processing system that extracts features from the training samples and that trains the classifier may be separate and remote from a data processing system on which object detection may occur. A trained classifier may be implemented in a data processing system on which object detection may occur.

Patches of the first image (the image in which objects are to be detected) are input (508) to the classifier and then classified (510). A patch is a portion of the whole image. For example, if an image is divided into 25 rectangular patches of equal size (pixels or otherwise), each patch would constitute a distinct 4% area of the image. However, other numbers, shapes, and sizes of patches are also within the scope of the present disclosure, as well as patches that overlap one or more other patches.

The patches are classified (510) as negative detection or positive detection. Features, such as HOG descriptors, are extracted from the patches. The classifier can use a statistical analysis to compare features extracted from the training samples and the features extracted from the patches of the first image in determining whether the patches are classified (510) as a positive or negative detection. For example, an SVM and/or other machine learning algorithm may implement such a statistical algorithm.

FIG. 6 is a schematic view of at least a portion of an example implementation of a classifier 600 according to one or more aspects of the present disclosure. The classifier 600 can be used to classify patches of an image, such as described above with respect to the classification (510) depicted in FIG. 5. The classifier can be a boosted cascade of simple features. The cascaded classifier includes multiple classifiers $C_0$ (606), $C_1$ (608), ... $C_N$ (610) through which a patch 602 that is input flows before being classified as a positive detection 612. The patch 602 may be determined to be a negative detection 604 at one or more of the multiple classifiers $C_0$ (606), $C_1$ (608), ... $C_N$ (610).

The multiple classifiers $C_0$ (606), $C_1$ (608), ... $C_N$ (610) can be trained on different sets of training samples. For example, the first classifier $C_0$ (606) in the cascade can be trained on features that use less computational resources, and subsequent classifiers $C_1$ (608) through $C_N$ (610) can have incrementally increasing complexity. In this manner, many patches 602 can be excluded from intensive computations in later classifiers by being classified as a negative detection 604 by earlier classifiers. Patches 602 that are not excluded as a negative detection 604 at one or more of the multiple classifiers $C_0$ (606), $C_1$ (608), ... $C_N$ (610) are determined to be a positive detection 612. Each of the multiple classifiers $C_0$ (606), $C_1$ (608), ... $C_N$ (610) may have the same number of training samples for training positives and for training negatives. Each of the multiple classifiers $C_0$ (606), $C_1$ (608), ... $C_N$ (610) may be trained on each of the training positives and different sets of the training negatives.

The patches 602 of the image may be input to the classifier 600 at different scales. HOG and/or other features can be extracted from the patches 602 at those different scales. The input may be via scanning implemented in a sliding window detector. The variation of resolution for each patch 602 can permit the classifier 600 to have multiple opportunities to detect an object within each patch, including in implementations in which no definite scale between the training samples and input patches is known before processing the image. As also described above, the patches may have boundaries that overlap, which may increase the likelihood that a single patch will capture an object, which in turn may increase the likelihood that the object will properly be detected.

In view of the entirety of the present disclosure, including the figures and the claims, a person having ordinary skill in the art will readily recognize that the present disclosure introduces an apparatus comprising a processing system, wherein the processing system comprises a processor and a memory including computer program code, and wherein the processing system is operable to: detect an equipment unit of a wellsite from a visible image; overlay the detected equipment unit of the visible image on a corresponding portion of a thermal image; and generate an alert when a temperature indicated by the corresponding portion of the thermal image is outside of an operational temperature range of the detected equipment unit.

The wellsite may be a hydraulic fracturing wellsite.

Detecting the equipment unit from the visible image may include: inputting patches of the visible image into a classifier; and, using the classifier, classifying the patches as a negative detection or a positive detection. The classifier may be a boosted cascade of simple features. The classifier may include a support vector machine. The classifier may be trained using histograms of oriented gradients of positive training samples and of negative training samples. Detecting the equipment unit from the visible image may further include: (A) extracting respective histograms of oriented gradients from the patches; and (B) classifying the patches as the negative detection or positive detection based on a statistical analysis based on: (1) the respective histograms of oriented gradients; and (2) histograms of oriented gradients of positive training samples and of negative training samples.

There may be no markers on the equipment unit of the wellsite.

The processing system may be further operable to perform a hybrid image registration between the visible image and the thermal image, wherein the hybrid image registration may determine a correspondence between the visible image and the thermal image used for the overlay.

The processing system may be further operable to identify the equipment unit as a specified equipment unit based on business rules.

The alert may be generated when the temperature indicated by the corresponding portion of the thermal image is above the operational temperature range.

The alert may be generated when the temperature indicated by the corresponding portion of the thermal image is below the operational temperature range.

The present disclosure also introduces an apparatus comprising: a first image-capturing device operable to capture a visible image; a second image-capturing device operable to capture a thermal image; a control center corresponding to a worksite, wherein the control center is communicatively coupled to the first image-capturing device and the second image-capturing device; and a processing system comprising a processor and a memory including computer program code. The processing system may be operable to: identify an equipment unit of the worksite from the visible image; correspond one or more portions of the thermal image to the equipment unit in the visible image; and generate an alarm when the one or more portions of the thermal image corresponding to the equipment unit indicates a temperature of the equipment unit is outside of an operational temperature range of the equipment unit.

The worksite may be a hydraulic fracturing wellsite.

The control center may be located at the worksite.

The apparatus may further comprise an aerial mobile vehicle, and at least one of the first image-capturing device and the second image-capturing device may be mounted on the aerial mobile vehicle. The control center may be communicatively coupled with at least one of the first image-capturing device and the second image-capturing device through the aerial mobile vehicle. The control center may be directly communicatively coupled with at least one of the first image-capturing device and the second image-capturing device.

The control center may include the processing system.

The processing system may be distributed across at least two of the first image-capturing device, the second image-capturing device, and a device of the control center.

There may be no markers on the equipment unit of the worksite.

Identifying the equipment unit from the visible image may include: separating patches of the visible image; extracting respective features of the patches; and performing a statistical analysis of the respective features of the patches based on known features of positive samples and of negative samples. The respective features of the patches may include histograms of oriented gradients. The statistical analysis may be performed using a support vector machine. The statistical analysis may include using a boosted cascade of simple features.

The equipment unit may be identified from the visible image as a specified equipment unit using business rules.

The present disclosure also introduces a method comprising operating a processing system comprising a processor and a memory including computer program code, wherein operating the processing system comprises: detecting an equipment unit from a visible image, the equipment unit being located at a worksite; matching one or more portions of a thermal image to the detected equipment unit of the visible image; and outputting an alarm when the one or more portions of the thermal image indicates a temperature outside of an operational temperature range of the equipment unit.

The worksite may be a hydraulic fracturing wellsite.

Detecting the equipment unit from the visible image may include: inputting patches of the visible image into a classifier; and, using the classifier, classifying the patches as a negative detection or a positive detection, the positive detection being indicative of the equipment unit being detected. The classifier may be a boosted cascade of simple features. The classifier may include a support vector machine. The classifier may be trained using histograms of oriented gradients of positive training samples and of negative training samples. Detecting the equipment unit from the visible image may further include: extracting respective histograms of oriented gradients from the patches; and classifying the patches as the negative detection or positive detection based on a statistical analysis based on the respective histograms of oriented gradients and histograms of oriented gradients of positive training samples and of negative training samples.

There may be no markers on the equipment unit of the worksite. The matching may comprise performing a hybrid image registration between the visible image and the thermal image. Operating the processing system may further comprise identifying the equipment unit as a specified equipment unit based on business rules.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. An apparatus comprising:
    a processing system comprising a processor and a memory including computer program code, wherein the processing system is operable to:
        identify a unique oilfield equipment unit of an oilfield wellsite by analyzing a visible image based on business rules relating to a plan for setting up and configuring a plurality of oilfield equipment units at the oilfield wellsite;
        determine a numbering scheme for the plurality of oilfield equipment units based on the unique oilfield equipment unit and based on the business rules;
        overlay the unique oilfield equipment unit of the visible image on a corresponding portion of a thermal image; and
        generate an alert when a temperature indicated by the corresponding portion of the thermal image is outside of an operational temperature range for the unique oilfield equipment unit.

2. The apparatus of claim 1 wherein identifying the unique oilfield equipment unit from the visible image includes:
    inputting patches of the visible image into a classifier; and
    using the classifier, classifying the patches as a negative detection or a positive detection.

3. The apparatus of claim 2 wherein identifying the unique oilfield equipment unit from the visible image further includes:

extracting respective histograms of oriented gradients from the patches; and
classifying the patches as the negative detection or the positive detection based on a statistical analysis of:
the respective histograms of oriented gradients; and
histograms of oriented gradients of positive training samples and of negative training samples.

4. The apparatus of claim 1 wherein the processing system is further operable to perform a hybrid image registration between the visible image and the thermal image, and wherein the hybrid image registration determines a correspondence between the visible image and the thermal image used for the overlay.

5. The apparatus of claim 1 wherein the alert is generated when the temperature indicated by the corresponding portion of the thermal image is above or below the operational temperature range.

6. An apparatus comprising:
a first image-capturing device operable to capture a visible image;
a second image-capturing device operable to capture a thermal image;
a control center corresponding to an oilfield worksite, wherein the control center is communicatively coupled to the first image-capturing device and the second image-capturing device; and
a processing system comprising a processor and a memory including computer program code, wherein the processing system is operable to:
identify a unique oilfield equipment unit of the oilfield worksite by analyzing the visible image based on business rules relating to a plan for setting up and configuring a plurality of oilfield equipment units at the oilfield worksite;
determine a numbering scheme for the plurality of oilfield equipment units based on the unique oilfield equipment unit and based on the business rules;
correspond one or more portions of the thermal image to the unique oilfield equipment unit in the visible image; and
generate an alarm when the one or more portions of the thermal image corresponding to the unique oilfield equipment unit indicates a temperature of the unique oilfield equipment unit is outside of an operational temperature range for the unique oilfield equipment unit.

7. The apparatus of claim 6 further comprising an aerial mobile vehicle, wherein the first image-capturing device and the second image-capturing device are mounted on the aerial mobile vehicle.

8. The apparatus of claim 7 wherein the control center is communicatively coupled with the first image-capturing device and the second image-capturing device through the aerial mobile vehicle.

9. The apparatus of claim 7 wherein the control center is directly communicatively coupled with the first image-capturing device and the second image-capturing device.

10. The apparatus of claim 6 wherein identifying the unique oilfield equipment unit from the visible image includes:

separating patches of the visible image;
extracting respective features of the patches; and
performing a statistical analysis of the respective features of the patches based on known features of positive samples and of negative samples, wherein the respective features of the patches include histograms of oriented gradients.

11. A method comprising:
operating a processing system comprising a processor and a memory including computer program code, wherein operating the processing system comprises:
identifying a unique oilfield equipment unit located at an oilfield worksite by analyzing a visible image based on business rules relating to a plan for setting up and configuring a plurality of oilfield equipment units at the oilfield worksite;
determining a numbering scheme for the plurality of oilfield equipment units based on the unique oilfield equipment unit and based on the business rules;
matching one or more portions of a thermal image to the unique oilfield equipment unit of the visible image; and
outputting an alarm when the one or more portions of the thermal image indicates a temperature outside of an operational temperature range for the unique oilfield equipment unit.

12. The method of claim 11 wherein the oilfield worksite is a hydraulic fracturing wellsite.

13. The method of claim 11 wherein identifying the unique oilfield equipment unit from the visible image includes:
inputting patches of the visible image into a classifier; and
using the classifier, classifying the patches as a negative detection or a positive detection, the positive detection being indicative of the unique oilfield equipment unit being detected.

14. The method of claim 13 wherein the classifier is a boosted cascade of simple features.

15. The method of claim 13 wherein the classifier includes a support vector machine.

16. The method of claim 13 wherein the classifier is trained using histograms of oriented gradients of positive training samples and of negative training samples.

17. The method of claim 13 wherein identifying the unique oilfield equipment unit from the visible image further includes:
extracting respective histograms of oriented gradients from the patches; and
classifying the patches as the negative detection or the positive detection based on a statistical analysis of:
the respective histograms of oriented gradients; and
histograms of oriented gradients of positive training samples and of negative training samples.

18. The method of claim 11 wherein the matching comprises performing a hybrid image registration between the visible image and the thermal image.

* * * * *